(12) United States Patent
Wang

(10) Patent No.: US 11,703,675 B2
(45) Date of Patent: Jul. 18, 2023

(54) DISPLAY PANEL AND MANUFACTURING METHOD THEREOF

(71) Applicant: TCL CHINA STAR OPTOELECTRONICS TECHNOLOGY CO., LTD., Guangdong (CN)

(72) Inventor: Yanan Wang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 81 days.

(21) Appl. No.: 16/980,411

(22) PCT Filed: Jun. 2, 2020

(86) PCT No.: PCT/CN2020/094026
§ 371 (c)(1),
(2) Date: Sep. 13, 2020

(87) PCT Pub. No.: WO2021/208210
PCT Pub. Date: Oct. 21, 2021

(65) Prior Publication Data
US 2021/0318585 A1   Oct. 14, 2021

(30) Foreign Application Priority Data
Apr. 13, 2020 (CN) .......................... 202010285132.9

(51) Int. Cl.
*G02B 26/00* (2006.01)
*G02F 1/157* (2006.01)
*G02F 1/163* (2006.01)

(52) U.S. Cl.
CPC ........... *G02B 26/005* (2013.01); *G02F 1/157* (2013.01); *G02B 26/004* (2013.01); *G02F 1/163* (2013.01);
(Continued)

(58) Field of Classification Search
CPC .... G02F 1/1525; G02F 1/15245; G02F 1/155; G02F 1/157; G02F 1/163; G02F 2201/44;
(Continued)

(56) References Cited

U.S. PATENT DOCUMENTS 8,681,423 B1 * 3/2014 Gibson ................ G02B 6/0035
349/196
2004/0189187 A1 * 9/2004 Chang ................. H01L 51/5281
313/506
(Continued)

FOREIGN PATENT DOCUMENTS

CN          101452114 A      6/2009
CN          101517624 A      8/2009
(Continued)

Primary Examiner — George G. King
(74) Attorney, Agent, or Firm — PV IP PC; Wei Te Chung; Zhigang Ma

(57) ABSTRACT

The present application provides a display panel and a manufacturing method of the display panel. When an electrochromic layer is completely closed, a metasurface structure and an electrowetting structure reflect a light with corresponding wavelength to form a reflection state. When the electrochromic layer is partially closed, the metasurface structure and the electrowetting structure corresponding to a part of the closed electrochromic layer reflect the light with corresponding wavelength to form the reflection state, and the light penetrates through the wetted metasurface structure and a part of the unclosed electrochromic layer to form a transparent state.

7 Claims, 4 Drawing Sheets

(52) U.S. Cl.
CPC ...... *G02F 2201/44* (2013.01); *G02F 2202/30* (2013.01)

(58) Field of Classification Search
CPC ............. G02F 2202/30; G02F 2202/36; G02F 2203/30; G02B 26/005; G02B 27/44; G02B 26/004
See application file for complete search history.

(56) References Cited

U.S. PATENT DOCUMENTS

| | | | |
|---|---|---|---|
| 2008/0060111 A1 | 3/2008 | Baacke et al. | |
| 2008/0174846 A1* | 7/2008 | Morozumi | G02B 26/004 359/228 |
| 2008/0297880 A1* | 12/2008 | Steckl | G02B 26/004 359/291 |
| 2009/0284824 A1 | 11/2009 | Feenstra et al. | |
| 2010/0309541 A1 | 12/2010 | Lo et al. | |
| 2011/0007046 A1 | 1/2011 | Tsai et al. | |
| 2011/0286073 A1 | 11/2011 | Lo et al. | |
| 2012/0096620 A1 | 4/2012 | Baacke | |
| 2012/0096621 A1 | 4/2012 | Baacke | |
| 2012/0098785 A1 | 4/2012 | Tatelbaum et al. | |
| 2013/0021292 A1 | 1/2013 | Tatelbaum et al. | |
| 2013/0271817 A1 | 10/2013 | Jung et al. | |
| 2013/0331704 A1 | 12/2013 | Salzman | |
| 2015/0013044 A1 | 1/2015 | Baacke | |
| 2015/0059053 A1 | 3/2015 | Baacke et al. | |
| 2016/0027391 A1* | 1/2016 | Gibson | G02B 6/0063 345/4 |

FOREIGN PATENT DOCUMENTS

| | | |
|---|---|---|
| CN | 101750732 A | 6/2010 |
| CN | 102914868 A | 2/2013 |
| CN | 102998791 A | 3/2013 |
| CN | 105511073 A | 4/2016 |
| CN | 107783337 A | 3/2018 |
| KR | 20180129207 A | 12/2018 |
| TW | 200907411 A | 2/2009 |
| TW | 201102734 A | 1/2011 |

* cited by examiner

DISPLAY PANEL AND MANUFACTURING METHOD THEREOF

FIELD OF INVENTION

The present invention relates to the technical field of display, particularly a display panel and a manufacturing method of the display panel.

BACKGROUND OF INVENTION

With development of technology, demand for outdoor displays is becoming more and more popular. Outdoor advertisement or identification demand of merchants, mobile office demand of the public and the like have diverse requirements on the displays, so conventional displays face more difficulties and challenges. A liquid crystal display has low light utilization efficiency, and this disadvantage is more pronounced in outdoor displays. Luminous efficiency and color intensity of organic light emitting diode (OLED) displays are significantly improved, but the OLED displays also face problems of cost and lifespan, which make the OLED displays unable to have an edge in outdoor display.

Technical Problem

The present application provides a display panel and a manufacturing method thereof to solve the technical problem that existing display panels have low light utilization efficiency, higher cost, and short lifespan.

Technical Solution

To achieve above objects, the present application provides a display panel which includes an electrochromic layer, an electrowetting structure, and a metasurface structure. The electrowetting structure is disposed at one side of the electrochromic layer. The metasurface structure is disposed in the electrowetting structure. When the electrochromic layer is completely closed, the metasurface structure and the electrowetting structure reflect a light with corresponding wavelength to form a reflection state. When the electrochromic layer is partially closed, the metasurface structure and the electrowetting structure corresponding to a part of the closed electrochromic layer reflect the light with corresponding wavelength to form the reflection state, and the light penetrates through the wetted metasurface structure and a part of the unclosed electrochromic layer to form a transparent state.

The display panel further includes a first substrate and a first electrode. The first substrate is disposed on a side of the electrochromic layer away from the metasurface, and the first electrode is disposed on a side of the electrochromic layer.

The electrowetting structure includes a dielectric layer and a hydrophobic layer. The dielectric layer is covered on the electrochromic layer and the first electrode, and the hydrophobic layer which is disposed on the dielectric layer. Wherein the metasurface structure is arranged between the dielectric layer and the hydrophobic layer.

The metasurface structure includes a substrate layer and a plurality of nanopillars. The substrate layer is disposed on the dielectric layer, and the nanopillars are arranged spaced apart on the substrate layer. Wherein one of the nanopillars include a first silicon oxide layer, a titanium oxide layer, and a second silicon oxide layer. The first silicon oxide layer is disposed on the substrate layer. The titanium oxide layer is disposed on the first silicon oxide layer. The second silicon oxide layer is disposed on the titanium oxide layer.

A gap between two adjacent nanopillars is 100 nm to 500 nm, a height of each of the nanopillars is 200 nm to 1000 nm, and a width of each of the nanopillars is 100 nm to 500 nm.

A thickness of the hydrophobic layer is smaller than a thickness of the nanopillars.

The display panel further includes a hydrophilic layer, a hydrophobic region, an electrowetting hydrophobic medium, a liquid layer, a second electrode, and a second substrate. The hydrophilic layer is disposed on the hydrophobic layer and close to an edge of the hydrophobic layer. The hydrophobic region is arranged on the same layer as the hydrophilic layer and close to an edge of the hydrophilic layer. The electrowetting hydrophobic medium is arranged in the hydrophobic region. The liquid layer covers the hydrophilic layer, the hydrophobic region, the electrowetting hydrophobic medium, and the dielectric layer. The second electrode is disposed on a surface, away from a side of the first substrate, of the liquid layer. The second substrate is disposed on the surface, away from the side of first substrate, of the second electrode.

When a voltage applied to the first electrode and the second electrode is greater than zero, the electrowetting hydrophobic medium is in a convergence state and converges on an upper surface of the hydrophobic region; and when the voltage applied to the first electrode and the second electrode is equal to zero, the electrowetting hydrophobic medium is in an unfolded state and completely covers the hydrophobic layer and the metasurface structure.

To achieve above objects, the present application further provides a manufacturing method of the display panel, and the manufacturing method includes the following steps:

Forming the electrochromic layer, and forming the electrowetting structure over the electrochromic layer. In the step of forming the electrowetting structure over the electrochromic layer, a metasurface structure id formed in the electrowetting structure. Wherein when the electrochromic layer is completely closed, the metasurface structure and the electrowetting structure reflect a light with corresponding wavelength to form a reflection state. When the electrochromic layer is partially closed, the metasurface structure and the electrowetting structure corresponding to a part of the closed electrochromic layer reflect the light with corresponding wavelength to form the reflection state, and the light penetrates through the wetted metasurface structure and a part of the unclosed electrochromic layer to form a transparent state.

In the step of forming the metasurface structure further includes forming a substrate layer on the electrochromic layer; forming a first silicon oxide layer on the substrate layer; forming a titanium oxide layer on the first silicon oxide layer; forming second silicon oxide layer on the titanium oxide layer; and etching the first silicon oxide layer, the titanium oxide layer, and the second silicon oxide layer by adopting an electron beam photoetching process and a plasma process to form a plurality of nanopillars which are arranged spaced apart.

Beneficial Effect

The present application provides a display panel and a manufacturing method of the display panel which achieve two kinds of display state such as a reflection state and a transparent state by disposing a metasurface structure in the electrowetting structure so that the metasurface structure has high color saturation, and an electrowetting technology compatible with the electrowetting structure can realize quick response time and low energy consumption. The display panel has a simple overall structure and high response speed, does not require a polarizer, and has a high light utilization rate, with light reflection efficiency of the light penetrating through the metasurface structure reaching as high as 70-80%, thereby significantly reducing display energy consumption.

DESCRIPTION OF DRAWINGS

The technical solutions and other advantages of the present application will become apparent from the following detailed description of specific embodiments of the present application when taken in conjunction with the accompanying drawings.

The reference characters in the figures are as follows.

Figure 1:
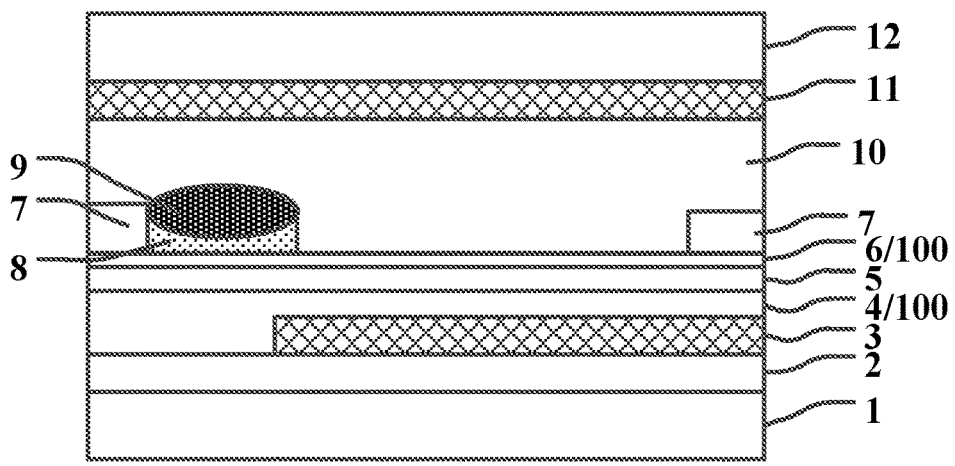
FIG. 1 is a structural schematic view of a subpixel in a display panel in a reflection state according to an embodiment.

| | |
|---|---|
| 1: first substrate | 2: electrochromic layer |
| 3: first electrode | 4: dielectric layer |
| 5: metasurface structure | 6: hydrophobic layer |
| 7: hydrophilic layer | 8: hydrophobic region |
| 9: electrowetting hydrophobic medium | |
| 10: liquid layer | 11: second electrode |
| 12: second substrate | 51: substrate layer |
| 52: nanopillar | 521: first silicon oxide layer |
| 522: titanium oxide layer | |
| 523: second silicon oxide layer | |
| 100: electrowetting structure | |

DETAILED DESCRIPTION OF PREFERRED EMBODIMENTS

The technical solutions in the embodiments of the present application will be clearly and completely described below with reference to the drawings in the embodiments of the present application, and it is obvious that the described embodiments are only a part of the embodiments of the present application, and not all of the embodiments. All other embodiments obtained by a person of ordinary skill in the art without any inventive work based on the embodiments in the present application are within the scope of protection of the present application.

The following disclosure provides many different embodiments or examples for implementing different features of the invention. In order to simplify the disclosure of the present invention, specific example components and arrangements are described below. Of course, they are merely examples and are not intended to limit the present invention. Moreover, the present invention may repeat reference numerals and/or letters in the various examples, such repetition is for the purpose of simplicity and clarity and does not in itself dictate a relationship between the various embodiments and/or configurations discussed. In addition, examples of various specific processes and materials are provided herein, but one of ordinary skill in the art may recognize applications of other processes and/or uses of other materials.

With development of technology, reflective displays have significant advantages in reducing a problem of energy consumption by utilizing external light, and have a large development space in terms of color and response speed. Hence, the reflective displays are among development directions of green energy display in the future.

The present embodiment provides a display panel and a manufacturing method thereof to achieve a total reflection display state and a transflective display state of the display panel, wherein the total reflection display panel is able to realize normal reflection display and color display, and the transflective display panel mainly utilizes a metasurface of a microstructure to construct full-color reflective display, and then the display panel realizes transparent display through the combination of the metasurface structure and electrowetting. The following description will be made of the display panel and the method for manufacturing the display panel.

Figure 4:
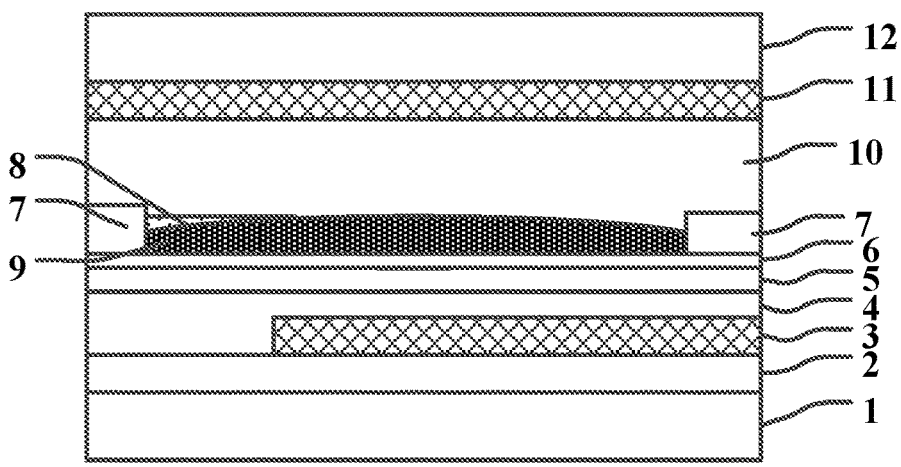
FIG. 4 is a structural schematic view of the subpixel in the display panel in a transparent state according to an embodiment.

As shown in FIG. 1 or FIG. 4, the present embodiment provides a display panel which includes a first substrate 1, an electrochromic layer 2, a first electrode 3, a dielectric layer 4, a metasurface structure 5, a hydrophobic layer 6, a hydrophilic layer 7, a hydrophobic region 8, a electrowetting hydrophobic medium 9, a liquid layer 10, a second electrode 11, and a second substrate 12.

The electrochromic layer 2 is disposed on an upper surface of the first substrate 1. The electrochromic layer 2 becomes transparent under voltage control for controlling the gray scale control of the display panel in the reflection state. The electrochromic layer 2 is controlled by separate electrodes of the different pixels.

The first electrode 3 is disposed on an upper surface of the electrochromic layer 2. The first electrode 3 is a transparent electrode, and the material of the first electrode 3 includes indium tin oxide (ITO), graphene, etc.

In this embodiment, an electrowetting structure 100 includes the dielectric layer 4 which is covered on the first electrode 3 and a part of the upper surface the electrochromic layer 2. The material of the dielectric layer 4 includes at least one of silicon oxide or silicon nitride.

The metasurface structure 5 is covered on the electrochromic layer 2 and is disposed on an upper surface of the dielectric layer 4. Under the irradiation of ambient light, different structures of the metasurface can display different colors, and higher color purity can be achieved. The metasurface structure 5 can reflect a specific wavelength structure, i.e. red sub-pixel (R), green sub-pixel (G), or blue sub-pixel (B), respectively, for RGB, which is a mechanism of structural color. In this embodiment, RGB may be separately displayed or may be displayed in a stacked manner, which is not limited herein.

Figure 2:
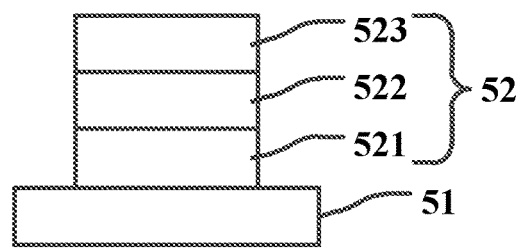
FIG. 2 is a structural schematic view of a metasurface structure.

As shown in FIG. 2, the metasurface structure 5 includes the substrate layer 51 and a plurality of nanopillars 52. The substrate layer 51 is disposed on the dielectric layer 4. The nanopillars 52 are arranged spaced apart on an upper surface of the substrate layer 51. A gap between two adjacent nanopillars 52 is 100 nm to 500 nm; a height of each of the nanopillars 52 is 200 nm to 1000 nm, and a width of each of the nanopillars 52 is 100 nm to 500 nm. Wherein a width of red, blue, and green of the display panel is R>G>B.

Each of the nanopillars 52 includes a first silicon oxide layer 521, a titanium oxide layer 522, and a second silicon oxide layer 523. The first silicon oxide layer 521 is disposed on the upper surface of the substrate layer 51. The titanium oxide layer 522 is disposed on an upper surface of the first silicon oxide layer 521. The second silicon oxide layer 523 is disposed on an upper surface of the titanium oxide layer 522.

Figure 3:
FIG. 3 is an enlarged view of the metasurface structure and a hydrophobic layer.

As shown in FIG. 3, in this embodiment, the electrowetting structure 100 includes the hydrophobic layer 6 which is disposed on the upper surface of the metasurface structure 5. A thickness of the hydrophobic layer 6 is less than a thickness of the nanopillars 52. A refractive index of the hydrophobic layer 6 is less than 1.3, and the thickness of the hydrophobic layer 6 is 50 nm to 300 nm. The material of the hydrophobic layer 6 may be at least one of dichloro-p-xylene dimer (Parylene C), Teflon AF, or amorphous fluorinated polymer (CYPOT). In this embodiment, the material of the hydrophobic layer 6 is preferably AE2400 which has a refractive index of 1.29. AF2400 is a random copolymer blend prepared with polytetrafluoroethylene 2, 2-difluoromethyl-4, 5-difluoro 1, 3-epoxy polymer in an amount of 85:15 molar weight. The hydrophobic layer 6 is formed by surface treatment of the metasurface structure 5 using AE 2400.

The hydrophilic layer 7 is disposed on an upper surface of the hydrophobic layer 6 and close to an edge of the hydrophobic layer 6.

The hydrophobic region 8 is arranged on the same layer as the hydrophilic layer 7 and close to an edge of the hydrophilic layer 7.

The hydrophobic area 8 is provided with the electrowetting hydrophobic medium 9 in the shape of a drop. A refractive index of the electrowetting hydrophobic medium 9 is greater than 1.4, and the material meets the hydrophobic property. A liquid material with high stability such as silicone oil and the like can be selected as the material of the electrowetting hydrophobic medium 9 to make the electrowetting hydrophobic medium 9 have high transparency. When the metasurface structure 5 is immersed in an environment with a refractive index greater than 1.4, the reflection effect on the colors of the metasurface structure 5 disappears, light completely penetrates, and the display panel turns into the transparent state. The electrowetting hydrophobic medium 9 is able to achieve an unfolded state and a convergence state.

The liquid layer 10 covers the hydrophilic layer 7, the hydrophobic region 8, the electrowetting hydrophobic medium 9, and an upper surface of the dielectric layer 4. The liquid layer 10 is preferably water and is a box thickness of the display panel. Wherein when the electrowetting hydrophobic medium 9 is in the unfolded state, the electrowetting hydrophobic medium 9 can completely submerge the metasurface structure 5. The amount of the electrowetting hydrophobic medium 9 does not need to be too much so that the liquid layer 10 won't be too thick, and is designed to be between 0.3 um to 10 um according to the pixel size of the display panel.

The second electrode 11 is disposed on the upper surface of the liquid layer 10. The second electrode 11 is a transparent electrode, and the material of the second electrode 11 includes indium tin oxide (ITO), graphene, etc.

The second substrate 12 is disposed on an upper surface of the second electrode 11. The second substrate 12 mainly controls whether a gray scale of the color is to be converted into a transparent state. The gray scale of the color refers to the area of a displayed color and the color contrast.

In this embodiment, the first electrode 3 on a side of the first substrate 1 and the second electrode 11 on a side of the second substrate 12 jointly control the spreading and convergence of the high refractive index liquid, mainly controlling the spreading and convergence of the electrowetting hydrophobic medium 9. A thickness of the liquid layer 10 is preferably 2 μm to 100 μm, and the arrangement is affected by the size of the pixel structure, and if the pixel structure is large, the thickness of the liquid layer 10 needs to be appropriately raised after the electrowetting hydrophobic medium 9 converges. By providing a plurality of spaced supporting structures between the first substrate 1 and the second substrate 12, the liquid layer 10 is made to rise. The supporting structures may be photo spacers (PS).

As shown in FIG. 1, during operation, when a voltage applied to the first electrode 3 and the second electrode 11 is greater than zero, the electrowetting hydrophobic medium 9 is in a convergence state and converges on an upper surface of the hydrophobic region 8.

As shown in FIG. 4, when the voltage applied to the first electrode 3 and the second electrode 11 is equal to zero, the electrowetting hydrophobic medium 9 is in an unfolded state and completely covers the hydrophobic layer 6 and the metasurface structure 5.

In this embodiment, the hydrophilic layer 7 is used for enabling water to contact the lower surface as quickly as possible by using the electrowetting technology during voltage driving, so that the convergence of the electrowetting hydrophobic medium 9 can be accelerated. The hydrophobic region 8 is used to stabilize the electrowetting hydrophobic medium 9 in a fixed position and to accelerate the convergence of the electrowetting hydrophobic medium 9.

In this embodiment, when the electrochromic layer is closed, the electrochromic layer is in a black opaque state and absorbs light incident on its surface, when the electrochromic layer is on, the electrochromic layer is in the transparent state, and light can penetrate the electrochromic layer.

When the electrowetting hydrophobic medium is spread, the electrowetting hydrophobic medium contacts the metasurface structure and submerges the surface of the metasurface structure, the reflection effect of the submerged part of the electrowetting hydrophobic medium disappears, the light irradiating the surface of the electrowetting hydrophobic medium penetrates, in this case, the light will be completely absorbed when the electrochromic layer becomes black, and the light completely penetrates when the electrochromic layer is in a transparent state and can be completely emitted from the other surface, namely, the transparent state. In order to achieve a better contrast effect, in a part of a normal reflection picture, corresponding pixel regions are closed, electrochromism in a single pixel is in a closed state or an open state.

The display state of the display panel is divided into a total reflection state and a transflective state. The following will take the RGB space discrete display as an example for introduction.

When the electrochromic layer is completely closed, the metasurface structure and the electrowetting structure reflect a light with corresponding wavelength to form a reflection state. Under total reflection state, when the electrochromic layer is completely closed, the metasurface structure reflects the light with corresponding wavelength and displays the black opaque state so that the metasurface structure is able to perform color reflection display.

When the electrochromic layer is partially closed, the metasurface structure and the electrowetting structure corresponding to a part of the closed electrochromic layer reflect the light with corresponding wavelength to form the reflection state, and the light penetrates through the wetted metasurface structure and a part of the unclosed electrochromic layer to form a transparent state. Specifically, the electrochromic layers corresponding to the display area are set to completely closed and normally reflect, so that the display effect is realized; the electrochromic layer corresponding to the non-display area is in an on state and does not reflect. In addition, the electrowetting hydrophobic medium changes intensity of the light reflected by the metasurface through controlling the size of the wetting area in the display area; the whole pixel of the electrowetting hydrophobic medium is in wet state, and light completely penetrates without reflection or absorption through combining the electrochromic layer in the non-display area.

The total reflection state and the transflective state will be described below by taking two sub-pixels as an example.

Figure 5:
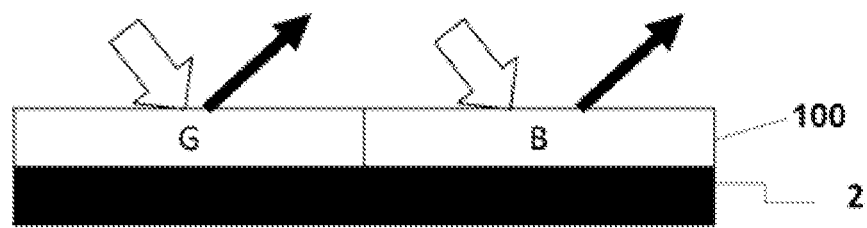
FIG. 5 is a simplified schematic view of electrochromic layers and electrowetting structures of a subpixel B and a subpixel G both in the reflection state according to an embodiment.

As shown in FIG. 5, in the total reflection state, the electrochromic layer is completely closed, and the electrochromic layer 2 is black and the light cannot penetrate and be reflected. Therefore, when the light irradiates the R sub-pixel and the G sub-pixel, the light with the corresponding wavelength is completely reflected, and the sub-pixel can control the gray scale display of the display panel by controlling the amount of the reflected light through the wet state.

Figure 6:
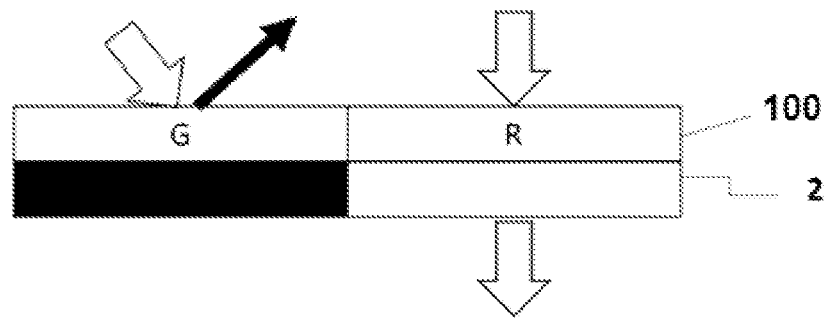
FIG. 6 is a simplified schematic view of an electrochromic layer and electrowetting structure of a subpixel R in the transparent state and the electrochromic layer and the electrowetting structure of the subpixel G in the reflection state according to an embodiment.

As shown in FIG. 6, in the transflective state, the G sub-pixel represents a normal display area, and the electrochromic layer corresponding to the display area is closed and is in black. The electrochromic layer corresponding to the R sub-pixel is in an open state and is in a transparent state, the electrowetting hydrophobic medium on the metasurface structure is in an unfolded state, the metasurface structure is wetting in the electrowetting hydrophobic medium, the reflection effect on the specified wavelength of light disappears, and the metasurface structure is in a transparent state, so that the whole area is in a transparent state.

The present embodiment provides a display panel which can achieve both of a reflection state and a transflective state by disposing a metasurface structure in the electrowetting structure so that the metasurface structure has high color saturation, and an electrowetting technology compatible with the electrowetting structure can realize quick response time and low energy consumption. The display panel has a simple overall structure and high response speed, does not require a polarizer, and has high light utilization rate, with light reflection efficiency of the light penetrating through the metasurface structure reaching as high as 70-80%, thereby significantly reducing display energy consumption.

Figure 7:
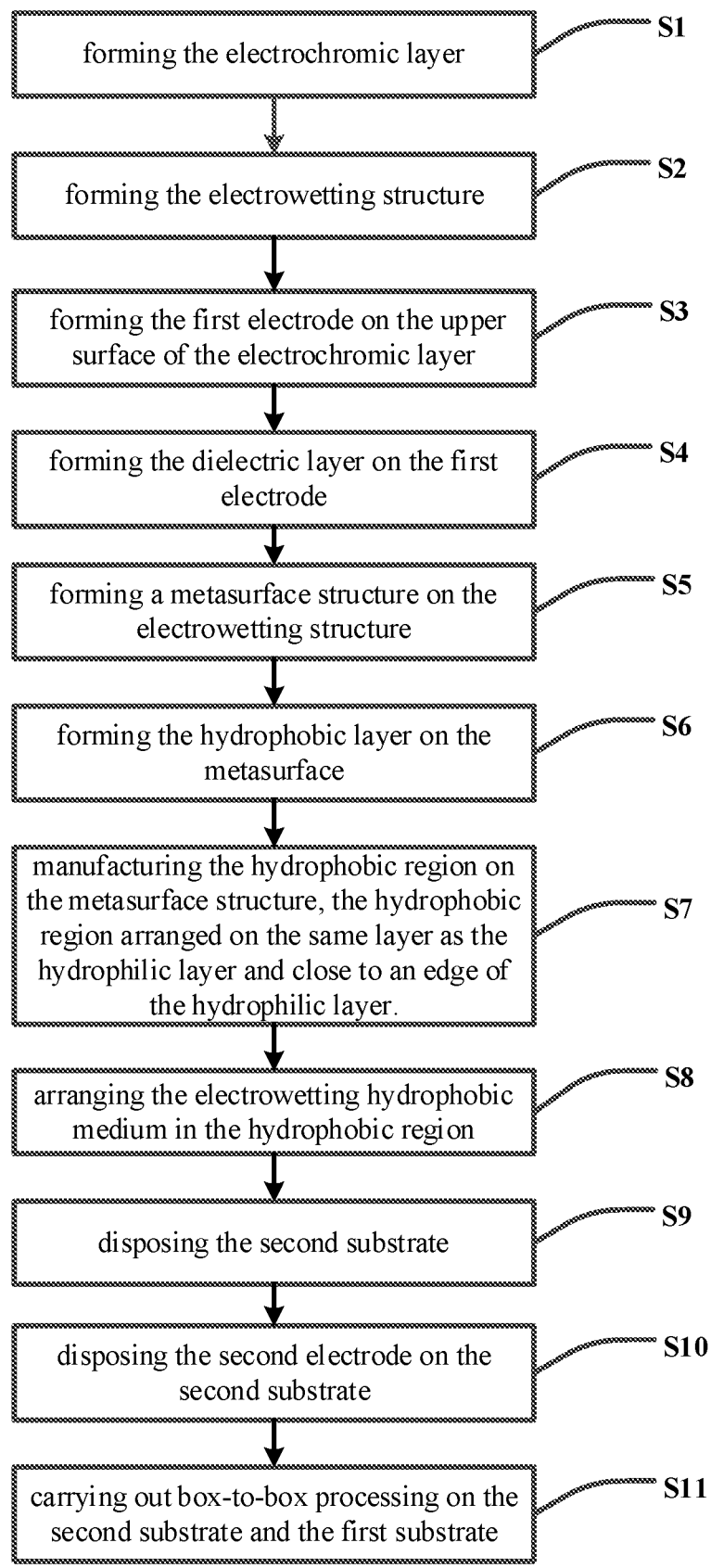
FIG. 7 is a flowchart of a display panel manufacturing method according to an embodiment.

As shown in FIG. 7, the present embodiment further provides a manufacturing method of a display panel, the manufacturing method includes following steps S1~S11.

S1, forming the electrochromic layer.

S2, forming the electrowetting structure over the electrochromic layer. The electrochromic layer changes to transparent in response to a voltage control for controlling the gray scale of the display panel in a reflective state. The electrochromic layer is controlled by a single electrode of a pixel.

S3, forming the first electrode on the upper surface of the electrochromic layer. The first electrode is a transparent electrode, and the material of the first electrode includes indium tin oxide (ITO), graphene, etc.

S4, forming the dielectric layer on the first electrode. The material of the dielectric layer includes at least one of silicon oxide or silicon nitride.

S5, forming a metasurface structure on the electrowetting structure.

Figure 8:
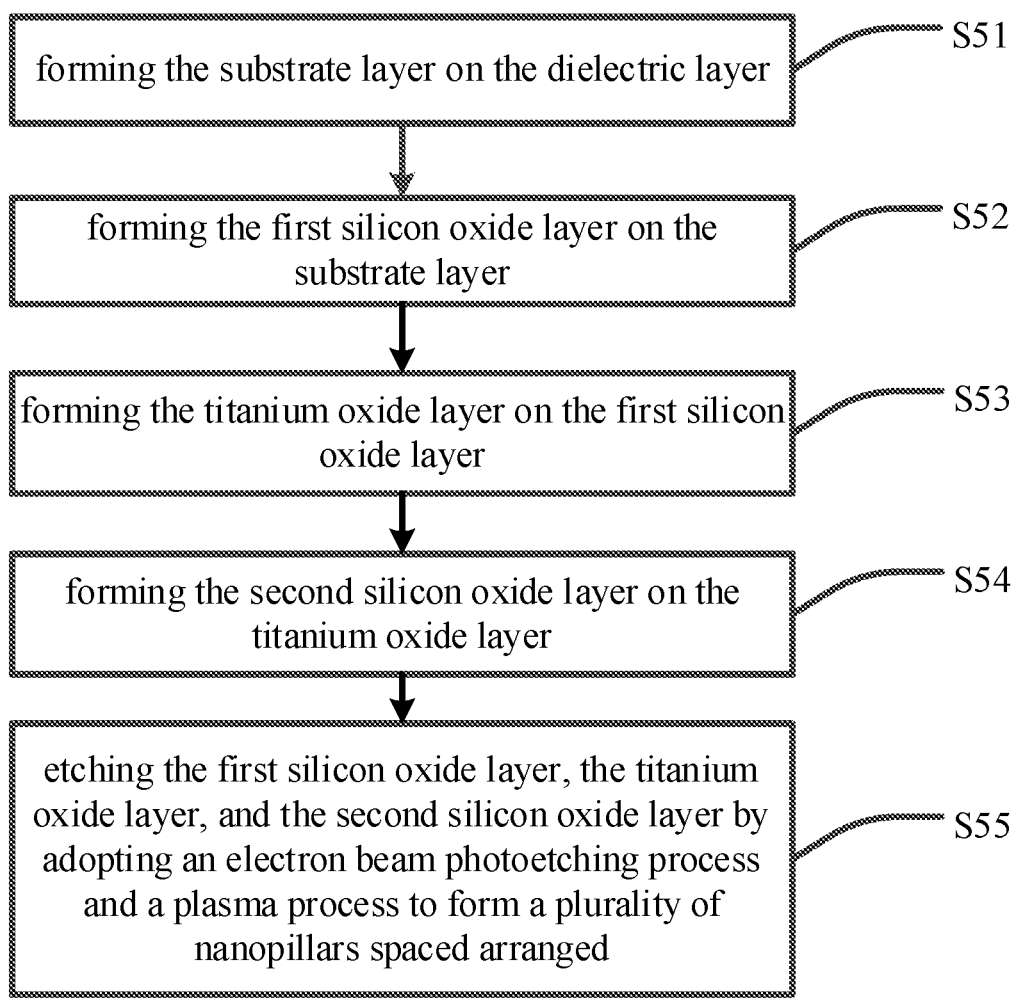
FIG. 8 is a flowchart of forming a metasurface.

As shown in FIG. 8, in the step of forming the metasurface structure, further includes following steps:

S51, forming the substrate layer on the dielectric layer.

S52, forming the first silicon oxide layer on the substrate layer.

S53, forming the titanium oxide layer on the first silicon oxide layer.

S54, forming the second silicon oxide layer on the titanium oxide layer.

S55, etching the first silicon oxide layer, the titanium oxide layer, and the second silicon oxide layer by adopting an electron beam photoetching process and a plasma process to form a plurality of nanopillars arranged spaced apart. The gap between two adjacent nanopillars is 100 nm to 500 nm; a height of each of the nanopillars is 200 nm to 1000 nm, and a width of each of the nanopillars is 100 nm to 500 nm. The width of red, green, and blue (RGB) three colors of the display panel is overall trend, R>G>B.

In this embodiment, when the metasurface structure is irradiated by ambient light, different structure of the metasurface structure displays different color, and the metasurface structure has high color saturation. The metasurface structure can reflect a structure with a specific wavelength, and respectively reflects a red sub-pixel (R), a green sub-pixel (G), or a blue sub-pixel (B), namely the metasurface structure is used for RGB, and is a mechanism of structural color. In this embodiment, RGB be displayed separately or in a stacked manner, but the present application is not limited herein.

S6, forming the hydrophobic layer on the metasurface. Specifically, the thickness of the hydrophobic layer is less than the thickness of the nanopillars. A refractive index of the hydrophobic layer 6 is less than 1.3, and the thickness of the hydrophobic layer 6 is 50 nm to 300 nm. The material of the hydrophobic layer may be at least one of dichloro-p-xylene dimer (Parylene C), Teflon AF, or amorphous fluorinated polymer (CYPOT). In this embodiment, the material of the hydrophobic layer is preferably AE2400 which has a refractive index of 1.29. AF2400 is a random copolymer blend prepared with polytetrafluoroethylene 2, 2-difluoromethyl-4, 5-difluoro 1, 3-epoxy polymer in an amount of 85:15 molar weight. The hydrophobic layer is formed by surface treatment of the metasurface structure using AE 2400.

S7, manufacturing the hydrophobic region on the metasurface structure. The hydrophobic region is arranged on the same layer as the hydrophilic layer and close to an edge of the hydrophilic layer.

S8, arranging the electrowetting hydrophobic medium in the hydrophobic region. A refractive index of the electrowetting hydrophobic medium is greater than 1.4, the material meets the hydrophobic property. A liquid material with high stability such as silicone oil and the like can be selected as the material of the electrowetting hydrophobic medium to make the electrowetting hydrophobic medium have high transparency. When the metasurface structure is immersed in an environment with a refractive index greater than 1.4, the reflection effect on the colors of the metasurface structure disappears, light completely penetrates, and the display panel turns into the transparent state. The electrowetting hydrophobic medium is able to be in an unfolded state and a convergence state.

S9, disposing the second substrate.

S10, disposing the second electrode on the second substrate. The second electrode is a transparent electrode, and the material of the first electrode includes indium tin oxide (ITO), graphene, etc.

S11, carrying out box-to-box processing on the second substrate and the first substrate. After the second substrate is turned over and is aligned and attached to the first substrate, a cavity is formed by the first substrate and the second substrate, liquid is injected into the cavity to form a liquid layer, and the liquid layer covers the hydrophilic layer, the hydrophobic area, the electrowetting hydrophobic medium, and the upper surface of the dielectric layer. The liquid layer is preferably water and is the box thickness of the display panel. The amount of the electrowetting hydrophobic medium does not need to be too much so that the liquid layer won't be too thick, and is designed to be between 0.3 um to 10 um according to the pixel size of the display panel.

In this embodiment, the first substrate mainly controls whether a gray scale of the color to be converted into a transparent state. The gray scale of the color refers to the area of a displayed color and the color contrast.

The display state of the display panel manufactured by above described method is divided into the total reflection state and the transflective state. The following will take the RGB space discrete display as an example for introduction.

Under total reflection state, when the electrochromic layer is completely closed, the metasurface structure reflects the light with corresponding wavelength and displays the black opaque state so that the metasurface structure is able to perform color reflection display.

When the electrochromic layer is completely closed, the metasurface structure and the electrowetting structure reflect a light with corresponding wavelength to form a reflection state. Under total reflection state, when the electrochromic layer is completely closed, the metasurface structure reflects the light with corresponding wavelength and displays the black opaque state so that the metasurface structure is able to perform color reflection display.

When the electrochromic layer is partially closed, the metasurface structure and the electrowetting structure corresponding to a part of the closed electrochromic layer reflect the light with corresponding wavelength to form the reflection state, and the light penetrates through the wetted metasurface structure and a part of the unclosed electrochromic layer to form a transparent state. Specifically, the electrochromic layers corresponding to the display area are set to completely closed and normally reflect, so that the display effect is realized; the electrochromic layer corresponding to the non-display area is in an on state and does not reflect. In addition, the electrowetting hydrophobic medium changes intensity of the light reflected by the metasurface through controlling the size of the wetting area in the display area; the whole pixels of the electrowetting hydrophobic medium is in wet state, and light completely penetrates without reflection or absorption through combining the electrochromic layer in the non-display area. In summary, the overall display effect is that the non-display area is in a transparent state, and the display area is in a display state.

In the above embodiments, the descriptions of the respective embodiments have respective emphasis, and for parts that are not described in detail in a certain embodiment, reference may be made to the related descriptions of other embodiments.

The display panel and the manufacturing method for the same provided by the embodiments of the present application are described in detail above. The principle and the embodiment of the present application are explained by applying specific examples, and the above description of the embodiments is only used to help understanding the technical solution and the core idea of the present application. Those of ordinary skill in the art will understand that: the technical solutions described in the foregoing embodiments may still be modified, or some technical features may be equivalently replaced; such modifications or substitutions do not depart from the spirit and scope of the present disclosure as defined by the claims.

What is claimed is:

1. A display panel, comprising a plurality of subpixels, wherein each of the plurality of subpixels comprises:
   an electrochromic layer;
   a first electrode disposed on a side of the electrochromic layer;
   an electrowetting structure, disposed at one side of the electrochromic layer, wherein the electrowetting structure comprises:
      a dielectric layer covered on the electrochromic layer and the first electrode; and
      a hydrophobic layer disposed on the dielectric layer;
   a metasurface structure arranged between the dielectric layer and the hydrophobic layer;
   an electrowetting hydrophobic medium, disposed above the electrowetting structure;
   a hydrophilic layer, disposed on the hydrophobic layer and close to an edge of the hydrophobic layer;
   a hydrophobic region defined on a same layer as the hydrophilic layer and close to an edge of the hydrophilic layer, wherein the electrowetting hydrophobic medium is arranged in the hydrophobic region;
   a liquid layer covering the hydrophilic layer, the hydrophobic region, the electrowetting hydrophobic medium, and the dielectric layer; and
   a second electrode disposed on a surface of the liquid layer;
   wherein each subpixel independently comprises at least a reflection state and a transparent state;
   in the reflection state, the electrochromic layer of the subpixel is completely closed, and the electrowetting hydrophobic medium of the subpixel is configured to substantially reveal an upper surface of the electrowetting structure of the subpixel such that the metasurface structure and the electrowetting structure of the subpixel reflect a light with a corresponding wavelength;
   in the transparent state, the electrochromic layer of the subpixel is in an open state, the electrowetting hydrophobic medium of the subpixel is configured to cover the electrowetting structure of the subpixel such that the light penetrates through the metasurface structure and the electrochromic layer of the subpixel to provide a transparent effect;
   wherein the display panel is configured to provide with two display states comprising a total reflection state and a transflective state;
   in the total reflection state, the plurality of subpixels are in the reflection state;

in the transflective state, one part of the plurality of subpixels are in the reflection state, and a rest of the plurality of subpixels are in the transparent state.

2. The display panel as claimed in claim 1, further comprising:
   a first substrate, disposed on a side of the electrochromic layer away from the metasurface.

3. The display panel as claimed in claim 1, wherein the metasurface structure comprises:
   a substrate layer, disposed on the dielectric layer; and
   a plurality of nanopillars, arranged spaced apart on the substrate layer, wherein one of the nanopillars comprises:
      a first silicon oxide layer, disposed on the substrate layer;
      a titanium oxide layer, disposed on the first silicon oxide layer; and
      a second silicon oxide layer, disposed on the titanium oxide layer.

4. The display panel as claimed in claim 3, wherein a gap between two adjacent nanopillars ranges from 100 nm to 500 nm, a height of each of the nanopillars ranges from 200 nm to 1000 nm, and a width of each of the nanopillars ranges from 100 nm to 500 nm.

5. The display panel as claimed in claim 3, wherein a thickness of the hydrophobic layer is smaller than a thickness of the nanopillars.

6. The display panel as claimed in claim 2, further comprising:
   a second substrate, disposed on a surface of the second electrode away from the side of the first substrate.

7. The display panel as claimed in claim 1, wherein the first electrode and the second electrode of one of the plurality of subpixels are configured to receive a voltage greater than zero such that the electrowetting hydrophobic medium of the subpixel is in a convergence state and converges on an upper surface of the hydrophobic region of the subpixel; and the first electrode and the second electrode of one of the plurality of subpixels are configured to receive a voltage equal to zero such that the electrowetting hydrophobic medium of the subpixel is in an unfolded state and completely covers the hydrophobic layer and the metasurface structure of the subpixel.

* * * * *